(12) United States Patent
Kiros et al.

(10) Patent No.: US 11,003,856 B2
(45) Date of Patent: May 11, 2021

(54) PROCESSING TEXT USING NEURAL NETWORKS

(71) Applicant: Google LLC, Mountain View, CA (US)

(72) Inventors: Jamie Ryan Kiros, Toronto (CA); William Chan, Markham (CA); Geoffrey E. Hinton, Toronto (CA)

(73) Assignee: Google LLC, Mountain View, CA (US)

( * ) Notice: Subject to any disclaimer, the term of this patent is extended or adjusted under 35 U.S.C. 154(b) by 43 days.

(21) Appl. No.: 16/283,632

(22) Filed: Feb. 22, 2019

(65) Prior Publication Data

US 2019/0258713 A1   Aug. 22, 2019

Related U.S. Application Data

(60) Provisional application No. 62/634,164, filed on Feb. 22, 2018, provisional application No. 62/666,650, filed on May 3, 2018.

(51) Int. Cl.
| | |
|---|---|
| *G06F 40/40* | (2020.01) |
| *G06F 40/289* | (2020.01) |
| *G06F 16/53* | (2019.01) |
| *G06K 9/72* | (2006.01) |
| *G06N 3/08* | (2006.01) |

(52) U.S. Cl.
CPC ............ *G06F 40/289* (2020.01); *G06F 16/53* (2019.01); *G06K 9/726* (2013.01); *G06N 3/08* (2013.01)

(58) Field of Classification Search
CPC ........... G06F 40/10; G06F 40/20; G06F 40/40
See application file for complete search history.

(56) References Cited

U.S. PATENT DOCUMENTS

| | | | | |
|---|---|---|---|---|
| 2010/0299332 | A1* | 11/2010 | Dassas | G06F 16/93 707/741 |
| 2018/0150143 | A1* | 5/2018 | Orr | G06N 3/084 |
| 2018/0210936 | A1* | 7/2018 | Reynolds | G06F 40/169 |
| 2019/0258713 | A1* | 8/2019 | Kiros | G06F 16/5846 |

(Continued)

OTHER PUBLICATIONS

Anderson et al. "Visually Grounded and Textual Semantic Models Differentially Decode Brain Activity Associated with Concrete and Abstract Nouns" ACL, 2017.

(Continued)

*Primary Examiner* — Daniel Abebe
(74) *Attorney, Agent, or Firm* — Fish & Richardson P.C.

(57) ABSTRACT

Methods, systems, and apparatus including computer programs encoded on a computer storage medium, for generating a data set that associates each text segment in a vocabulary of text segments with a respective numeric embedding. In one aspect, a method includes providing, to an image search engine, a search query that includes the text segment; obtaining image search results that have been classified as being responsive to the search query by the image search engine, wherein each image search result identifies a respective image; for each image search result, processing the image identified by the image search result using a convolutional neural network, wherein the convolutional neural network has been trained to process the image to generate an image numeric embedding for the image; and generating a numeric embedding for the text segment from the image numeric embeddings for the images identified by the image search results.

30 Claims, 4 Drawing Sheets

(56) References Cited

U.S. PATENT DOCUMENTS

2020/0250538 A1* 8/2020 Li .......................... G06N 20/00
2020/0252766 A1* 8/2020 Reynolds .............. G06F 21/604

OTHER PUBLICATIONS

Arevalo et al. "Gated Multimodal Units for Information Fusion" arXiv:1702.01992, 2017.
Ba et al. "Layer Normalization" arXiv:1607.06450, 2016.
Bahdanau et al. "An ActorCritic Algorithm for Sequence Prediction" ICLR, 2017.
Bahdanau et al. "Neural Machine Translation by Jointly Learning to Align and Translate" ICLR, 2015.
Bergsma et al. "Learning Bilingual Lexicons using the Visual Similarity of Labeled Web Images" IJCAI, 2011.
Bergsma et al. "Using Visual Information to Predict Lexical Preference" RANLP, 2011.
Bhaskar et al. "Exploring Multi-Modal Text+Image Models to Distinguish between Abstract and Concrete Nouns" IWCS Workshop on Foundations of Situated and Multimodal Communication, 2017.
Bowman et al. "A large annotated corpus for learning natural language inference" EMNLP, 2015.
Bruni et al. "Multimodal Distributional Semantics" Journal of Artificial Intelligence Research 49(1), 2014.
Brysbaert et al. "Concreteness ratings for 40 thousand generally known English word lemmas" Behavior Research Methods 46(3), 2013.
Bulat et al. "Vision and Feature Norms: Improving automatic feature norm learning through cross-modal maps" NAACL, 2015.
Caglayan et al. "LIUM-CVC Submissions for WMT17 Multimodal" Conference on Machine Translation, 2017.
Cettolo et al. "Report on the 11th IWSLT Evaluation Campaign, IWSLT 2014" IWSLT, 2014.
Chrupala et al. "Learning language through pictures" EMNLP, 2015.
Collell et al. "Imagined Visual Representations as Multimodal Embeddings" AAAI, 2017.
Collell et al. "Is an Image Worth More than a Thousand Words? On the Fine-Grain Semantic Differences between Visual and Linguistic Representations" COLING, 2016.
Conneau et al. "Supervised Learning of Universal Sentence Representations from Natural Language Inference Data" EMNLP 2017.
Conneau et al. "Very deep convolutional networks for text classification" EACL, 2017.
Denkowski et al. "Meteor universal: Language specific translation evaluation for any target language" EACL, 2014.
Elliott et al. "Findings of the Second Shared Task on Multimodal Machine Translation and Multilingual Image Description" Conference on Machine Translation, 2017.
Elliott et al. "Multi30K: Multilingual English-German Image Description" ACL: Workshop on Vision and Language, 2016.
Faghri et al. "VSE++: Improving VisualSemantic Embeddings with Hard Negatives" arXiv:1707.05612, 2017.
Glavas et al. "If Sentences Could See: Investigating Visual Information for Semantic Textual Similarity" IWCS, 2017.
Gu et al. "Look, Imagine and Match: Improving Textual-Visual Cross-Modal Retrieval with Generative Models" CVPR, 2018.
Hartmann et al. "Limitations of Cross-Lingual Learning from Image Search" arXiv:1709.05914, 2017.
He et al. "Deep Residual Learning for Image Recognition" CVPR, 2016.
Hill et al. "Learning Abstract Concept Embeddings from Multi-Modal Data: Since You Probably Can't See What I Mean" EMNLP, 2014.
Hill et al. "Learning distributed representations of sentences from unlabelled data" NAACL. 2016.
Hill et al. "SimLex-999: Evaluating Semantic Models with (Genuine) Similarity Estimation" Computational Linguistics 41(4), 2015.
Hochreiter et al. "Long Short-Term Memory" Neural Computation 9(8), 1997.
Huang et al. "Learning Semantic Concepts and Order for Image and Sentence Matching" CVPR, 2018.
Huang et al. "Towards Neural Phrase-based Machine Translation" ICLR, 2018.
Im et al. "Distance-based self-attention network for natural language inference" arXiv:1712.02047, 2017.
Inan et al. "Tying Word Vectors and Word Classifiers: A Loss Framework for Languag Modeling" ICLR, 2017.
Joulin et al. "Bag of Tricks for Efficient Text Classification" EACL, 2017.
Joulin et al. "Learning Visual Features from Large Weakly Supervised Data" ECCV, 2016.
Kiela "MMFeat: A Toolkit for Extracting Multi-Modal Features" ACL: System Demonstrations, 2016.
Kiela et al. "Comparing data sources and architectures for deep visual representation learning in semantics" EMNLP, 2016.
Kiela et al. "Efficient Large-Scale MultiModal Classification" AAAI, 2018.
Kiela et al. "Exploiting Image Generality for Lexical Entailment Detection" ACL, 2015.
Kiela et al. "Improving Multi-Modal Representations Using Image Dispersion: Why Less is Sometimes More" ACL, 2014.
Kiela et al. "Learning Image Embeddings using Convolutional Neural Networks for Improved Multi-Modal Semantics" EMNLP, 2014.
Kiela et al. "Learning Visually Grounded Sentence Representations" arXiv:1707.06320, 2017.
Kiela et al. "Visual Bilingual Lexicon Induction with Transferred ConvNet Features" EMNLP, 2015.
Kingma et al. "Adam: A Method for Stochastic Optimization" ICLR, 2015.
Kiros et al. "Skip-thought vectors" NIPS, 2015.
Kiros et al. "Unifying Visual-Semantic Embeddings with Multimodal Neural Language Models" arXiv:1411.2539, 2015.
Kiros et al."Illustrative Language Understanding. Large-Scale Visual Grounding with Image Search".
Lazaridou et al. "Combining Language and Vision with a Multimodal Skip-gram Model" ACL, 2015.
Lee et al. "Stacked Cross Attention for Image-Text Matching" arXiv:1803.08024, 2018.
Lin et al. "Microsoft COCO: Common Objects in Context" ECCV, 2014.
Logeswaran et al. "An efficient framework for learning sentence representations" ICLR, 2018.
Mao et al. "Training and Evaluating Multimodal Word Embeddings with Large-scale Web Annotated Images" NIPS, 2016.
Marelli et al. "A SICK cure for the evaluation of compositional distributional semantic models" LREC, 2014.
McCann et al. "Learned in translation: Contextualized word vectors" NIPS, 2017.
Melamud et al. "context2vec: Learning Generic Context Embedding with Bidirectional LSTM" CoNLL, 2016.
Pennington et al. "GloVe: Global Vectors for Word Representation" EMNLP, 2014.
Pereyra et al. "Regularizing Neural Networks by Penalizing Confident Output Distributions" ICLR Workshop, 2017.
Peters et al. "Semi-supervised sequence tagging with bidirectional language models" ACL, 2017.
Peters et al."Deep contextualized word representations" arXiv:1802. 05365, 2018.
Press et al. "Using the Output Embedding to Improve Language Models" EACL, 2017.
Ranzato et al. "Sequence Level Training with Recurrent Neural Networks" ICLR, 2016.
Semeniuta et al. "Recurrent Dropout without Memory Loss" COLING, 2016.
Sennrich et al. "Neural Machine Translation of Rare Words with Subword Units" ACL, 2016.
Shen et al. "Reinforced Self-Attention Network: a Hybrid of Hard and Soft Attention for Sequence Modeling" arXiv:1801.10296, 2018.

(56) References Cited

OTHER PUBLICATIONS

Shutova et al. "Black Holes and White Rabbits: Metaphor Identification with Visual Features" NAACL, 2016.
Silberer et al. "Visually Grounded Meaning Representations" PAMI, 2017.
Sutskever et al. "Sequence to Sequence Learning with Neural Networks" NIPS 2015.
Szegedy et al. "Rethinking the Inception Architecture for Computer Vision" CVPR, 2016.
Tai et al. "Improved Semantic Representations From Tree-Structured Long Short-Term Memory Networks" ACL, 2015.
Thoma et al. "Towards Holistic Concept Representations: Embedding Relational Knowledge, Visual Attributes, and Distributional Word Semantics" ISWC, 2017.
Vulic et al. "Multi-Modal Representations for Improved Bilingual Lexicon Learning" ACL, 2016.
Wang et al. "Learning Fine-grained Image Similarity with Deep Ranking" CVPR, 2014.
Wang et al. "Learning Multimodal Word Representation via Dynamic Fusion Methods" AAAI, 2018.
Williams et al. "A Broad-Coverage Challenge Corpus for Sentence Understanding through.Inference" arXiv:1704.05426, 2017.
Wiseman et al. "Sequence-to-Sequence Learning as Beam-Search Optimization" EMNLP, 2016.
Zablocki et al. "Learning Multi-Modal Word Representation Grounded in Visual Context" AAAI, 2018.
Zhang et al. "Character-level Convolutional Networks for Text Classification" NIPS, 2015.

\* cited by examiner

PROCESSING TEXT USING NEURAL NETWORKS

CROSS-REFERENCE TO RELATED APPLICATIONS

This application claims priority to U.S. Provisional Application No. 62/634,164, filed on Feb. 22, 2018, and claims priority to U.S. Provisional Application No. 62/666,650, filed on May 3, 2018. The disclosures of the prior applications are considered part of and are incorporated by reference in the disclosure of this application.

BACKGROUND

This specification relates to processing text using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that generates or uses numeric embeddings of text segments. A text segment can be a word or a phrase that includes multiple words. A numeric embedding of a text segment is an ordered collection of numeric values, e.g., a vector of floating point or quantized floating point values, in an embedding space having a pre-determined dimensionality. In particular, the system generates and/or uses numeric embeddings that are grounded using image search, i.e., that incorporate visual features associated with text segments by making use of image search.

The subject matter described in this specification can be implemented in particular embodiments so as to realize one or more of the following advantages.

A variety of machine learning systems receive as input and operate on embeddings of text segments. For example, machine learning systems that perform machine translation receive as input embeddings of text in the source language that is to be translated and operate on the embeddings to translate the text into a source language. As another example, machine learning systems that perform natural language processing tasks, e.g., text summarization, part of speech tagging, entity tagging, and so on, receive as input embeddings of text and operate on the embeddings to perform the natural language processing task on the text. Once generated, the described embeddings can be used to improve the performance of any of these machine learning systems. That is, because the embeddings are grounded using image search as described in this specification, when the embeddings or embeddings derived from the embeddings are used to represent the corresponding text segments by a machine learning system, the performance of the system can be improved relative to using conventional embeddings.

Additionally, the system can effectively generate embeddings for a vocabulary that includes a large number of text segments without consuming an excessive amount of computational resources. In particular, because the system leverages a pre-trained convolutional neural network and an existing image search engine, the system can efficiently generate a large number of visually grounded embeddings.

This specification also describes techniques for combining the described embeddings with embeddings generated using other sources using a gating neural network. By generating a combined embedding in this manner, the weight assigned to the image search grounded embeddings can be determined in a task-specific manner during the training of the gating neural network. This allows the performance of the machine learning system that employs the gating neural network to be further improved. That is, the performance of a system that incorporates the gating system instead of using conventional approaches to embed network inputs will be improved.

Additionally, the described embeddings can be used to improve the quality of the outputs generated by a neural network system by replacing, as described in this specification, the conventional output layer of the neural network system by a layer that searches for similarity between an internal representation generated by the neural network, i.e., the data that would have otherwise been the input to the conventional output layer, and the numeric embeddings of the text segments. By selecting outputs in this manner, i.e., by selecting output text segments according to the similarity measure, the system can generate higher quality output sequences without an excessive increase of the computational resources required to run the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
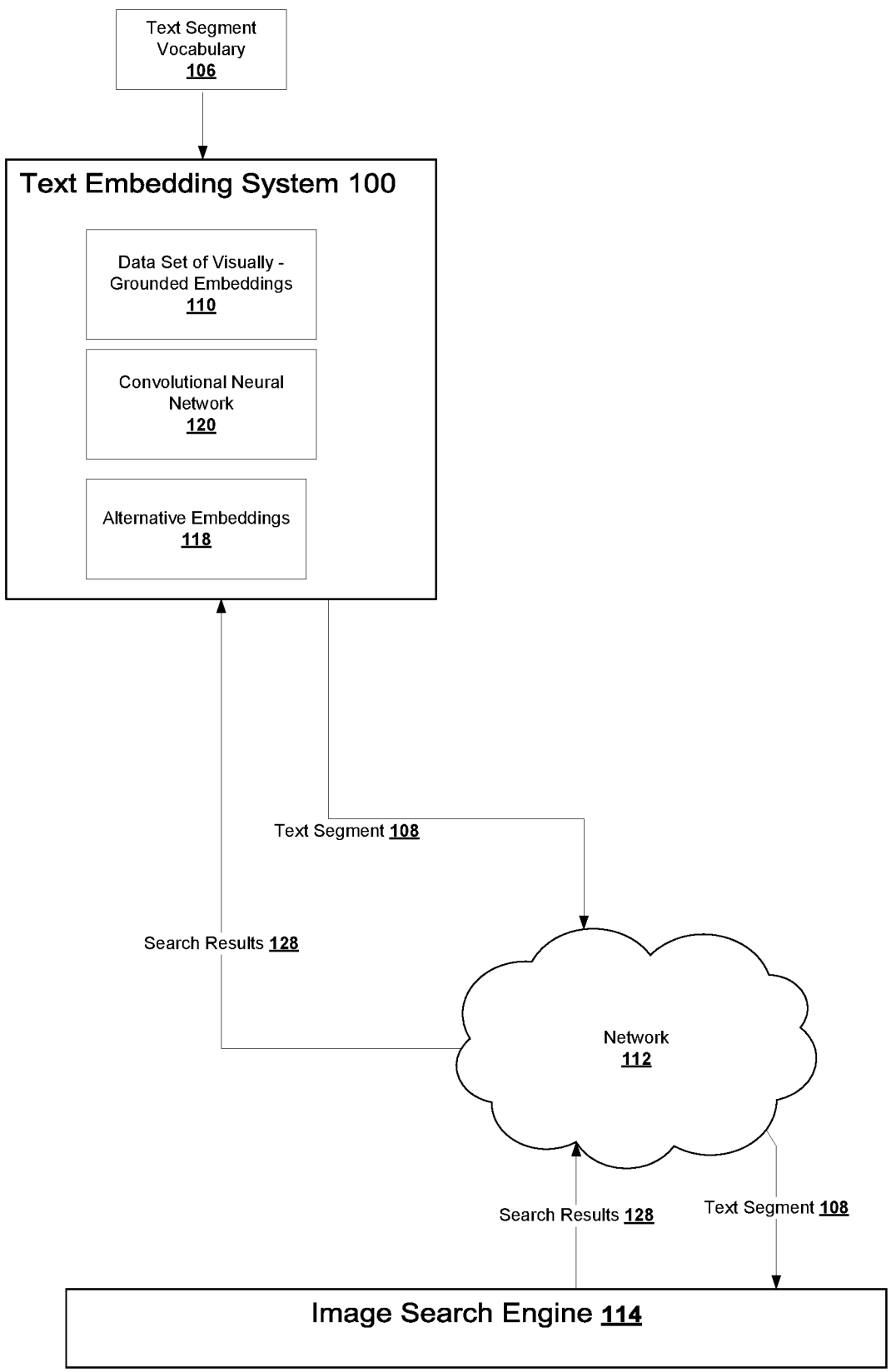
FIG. 1 shows an example text embedding system.

FIG. 1 shows an example text embedding system 100. The text embedding system 100 is an example of an example of a system implemented as computer programs on one or more computers in one or more locations, in which the systems, components, and techniques described below can be implemented.

The text embedding system 100 generates numeric embeddings of text segments. In particular, the text embedding system 100 receives a vocabulary of text segments 106 and generates a data set 110 that includes a respective numeric embedding for each of the text segments in the vocabulary 106.

The text segments in the vocabulary 106 can include words, multi-word phrases, or both. That is, in some implementations, the vocabulary is a vocabulary of words. In some other implementations, the vocabulary is a vocabulary of multi-word phrases. In yet other implementations, the vocabulary includes both words and multi-word phrases.

A numeric embedding of a text segment is an ordered collection of numeric values, e.g., a vector of floating point or quantized floating point values, in an embedding space having a pre-determined dimensionality.

In particular, the system 100 generates numeric embeddings that are grounded using image search, i.e., that incorporate visual features associated with text segments by making use of an image search engine 114. Because the embeddings are generated using image search, the embeddings generated by the system 100 will be referred to in this specification as "visually-grounded" embeddings.

The system 100 can interact with the image search engine 114 through a data communication network 112, e.g., local area network (LAN) or wide area network (WAN), e.g., the Internet, or a combination of networks.

The image search engine 114 is configured to search a collection of images. Generally the images in the collection are images that are found on web pages on the Internet. In particular, the image search engine 114 can be any image search engine on the Internet that receives search queries and, in response, provides image search results that the image search engine has classified as being responsive to the search query and that each identify a respective image. Generally, the image search engine orders the image search results based on responsiveness, i.e., from most responsive to least responsive.

Thus, the system 100 can submit a search query that includes a text segment 108 to the image search engine 114 through the network 112 and receive, in response to the search query, image search results 128 that the image search engine 114 has classified as being responsive to the search query.

The system 100 also includes a convolutional neural network 120. The convolutional neural network 120 is a neural network that includes multiple convolutional neural network layers and that has been trained to generate embeddings of images (referred to in this specification as "image embeddings"). In particular, the convolutional neural network 120 has been trained on a particular objective to generate image embeddings that reflect certain properties of the images that are input to the convolutional neural network 120. As a particular example, the convolutional neural network 120 can have been trained on a semantic ranking objective to generate image numeric embeddings that preserve semantic similarities between input images. The semantic ranking objective may be in the form of a hinge loss that operates on triplets of training images and is based on a semantic similarity between the images in the triplet. An example architecture for the convolutional neural network and example techniques for training the convolutional neural network to preserve semantic similarities between images are described in Jiang Wang, Yang Song, Thomas Leung, Chuck Rosenberg, Jingbin Wang, James Philbin, Bo Chen, and Ying Wu. 2014. Learning Fine-grained Image Similarity with Deep Ranking. In CVPR.

Generating the data set 110 using the image search engine 114 and the convolutional neural network 120 is described in more detail below with reference to FIG. 2.

Once the system 100 has generated the data set 110, the system 100 can use the generated data set 110 for any of a variety of purposes to improve the operation of any of a variety of machine learning systems.

For example, the system can provide the embeddings as input to a machine learning system as representations of the corresponding text segments. Because of the way that the visually-grounded embedding have been generated, using the visually-grounded embeddings in place of embeddings generated using other techniques can improve the performance of the machine learning system on any of a variety of machine learning tasks.

As another example, the system can combine the embeddings in the data set 110 with embeddings from a different data set (the alternative data set 118) that has been generated using a different technique in order to provide task-specific embeddings in response to received requests. The alternative data set 118 can have been generated using any conventional technique for generating text embeddings. An example of an alternative data set 118 are Glove embeddings generated as described in Jeffrey Pennington, Richard Socher, and Christopher Manning. 2014. GloVe: Global Vectors for Word Representation. In EMNLP. Another example of an alternative data set 118 are word2vec embeddings generated as described in Tomas Mikolov, et al, Distributed Representations of Words and Phrases and their Compositionality.

In other words, the system can receive a request for an embedding of a text segment in the vocabulary for use in some machine learning task, i.e., to be provided as input to a task-specific machine learning model that is configured to perform the machine learning task. The system can combine the visually-grounded embedding of the text segment and the embedding of the text segment that was generated using the other technique in a task-specific manner to generate a final embedding and then provide the final embedding in response to the request.

Combining embeddings in a task-specific manner is described in more detail below with reference to FIG. 3.

As another example, the system can use the generated visually-grounded embeddings to improve the operation of a task-specific neural network that generates outputs that include text segments in the vocabulary. In particular, the system can replace a conventional output layer of the task-specific neural network with operations that use the visually-grounded embedding to select the outputs that are generated by the task-specific neural network.

Using the visually-grounded embeddings to select outputs is described in more detail below with reference to FIG. 4.

Figure 2:
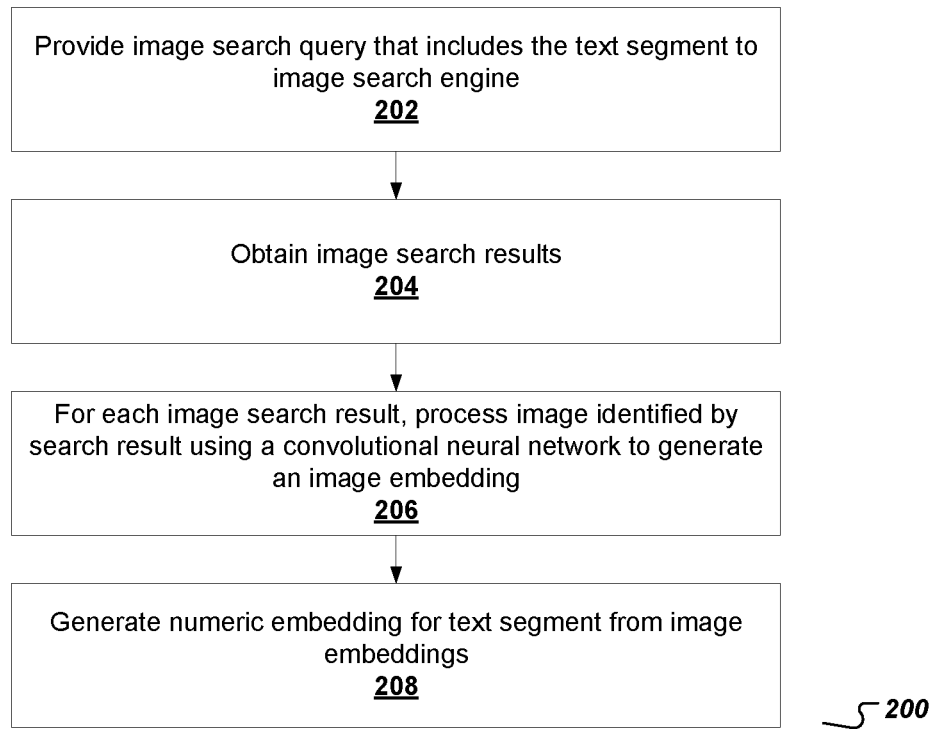
FIG. 2 is a flow chart of an example process for generating a visually-grounded embedding of a text segment.

FIG. 2 is a flow diagram of an example process for generating an embedding of a text segment. For convenience, the process 200 will be described as being performed by a system of one or more computers located in one or more locations. For example, an embedding system, e.g., the embedding system 100 of FIG. 1, appropriately programmed in accordance with this specification, can perform the process 200.

The system can perform the process 200 for each text segment in a vocabulary of text segments to generate a data set that associates each text segment in the vocabulary with a respective visually-grounded numeric embedding.

The system provides, to an image search engine, a search query that includes the text segment (step 202).

The system obtains, from the image search engine, image search results for the search query (step 204). The image search results each identify a respective image and have been classified as being responsive to the search query by the image search engine. The image search results have also been ordered by the image search engine from most responsive to least responsive, i.e., with the first search result in the order being the most responsive, the fifth search result in the order being the fifth-most responsive, and so on.

In some cases, the system receives, from the image search engine, an initial set of image search results that are ordered by the image search engine from most responsive to least responsive and selects a subset of the initial set of image search results that are most responsive to the search query according to the order to use in generating the embedding for the text segment. For example, the system can select the top five, ten, or twenty most responsive search results for use in generating the embedding for the text segment.

For each image search result, the system processes the image identified by the image search result using a convolutional neural network (step 206).

As described above, the convolutional neural network has been trained to process an input image to generate an image numeric embedding for the image.

The system generates a numeric embedding for the text segment from the image numeric embeddings for the images identified by the image search results (step 208). In particular, the system combines the image numeric embeddings for the images identified by the search results to generate the numeric embedding for the text segment.

As a particular example, the system can concatenate the image numeric embeddings according to the ordering of the corresponding image search results, i.e., so that the embedding of the text segment is a concatenation of the image numeric embeddings of the search result. In other words, the system concatenates the image numeric embeddings with the image embedding for the first search result in the order being first, the image numeric embedding for the fifth search result in the order being fifth, and so on.

By performing the process 200 for all of the text segments in the vocabulary, the system generates embeddings of the text segments that are visually-grounded. In particular, because the embedding for a given text segment is derived from embeddings of images that are relevant to the text segment, the embeddings represent effectively represent the semantics of the text segment.

As described above, in some cases, the system also maintains a different set of embeddings for the text segments in the vocabulary, i.e., embeddings that are generated using a different technique. In these cases, the system can receive a request for a combined (or "final") numeric embedding of a text segment in the vocabulary for use in performing a particular machine learning task and can use a gating neural network to combine the two different kinds of embeddings for the text segments.

More specifically, because the gating neural network has been trained in a task-specific manner, i.e., on data that is specific to the particular machine learning task, the system can combine the embeddings in a manner that is optimized for the particular machine learning task and that therefore results in improved performance on the particular machine learning task relative to using only one kind of embedding for the task or using a fixed, non-task dependent combination of the two kinds of embeddings. The embeddings maintained by the system but generated using the other technique will be referred to in this specification as "second embeddings."

Figure 3:
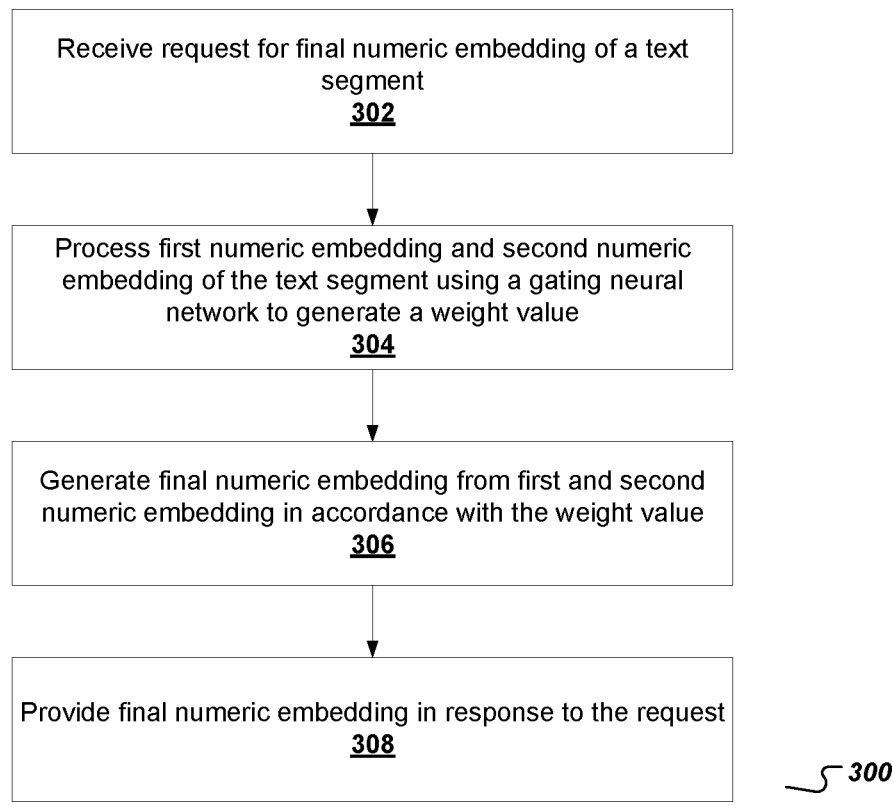
FIG. 3 is a flow chart of an example process for generating a final embedding of a text segment.

FIG. 3 is a flow diagram of an example process 300 for generating a final embedding of a text segment. For convenience, the process 300 will be described as being performed by a system of one or more computers located in one or more locations. For example, an embedding system, e.g., the text embedding system 100 of FIG. 1, appropriately programmed in accordance with this specification, can perform the process 300.

The system receives a request for a final embedding of a first text segment in the vocabulary of text segments (step 302).

The system processes the visually-grounded embedding and the second embedding of the first text segment using a gating neural network to generate a weight value (step 304).

The gating neural network has been trained to generate weight values that result in embeddings that have high performance on the particular machine learning task. In particular, the gating network has been trained jointly with a task-specific neural network on training data for the particular task to adjust the values of the parameters to cause the gating network to generate weight values that are more useful for the particular task.

As a particular example, the gating neural network can be a neural network that has one or more hidden layers, i.e., one or more fully-connected layers, followed by a sigmoid output layer that generates the weight value.

The system generates the final embedding of the first text segment using the visually-grounded embedding, the second embedding, and the weight value (step 306).

In particular, the system processes the visually-grounded embedding of the first text segment using a first encoder neural network to generate a first encoded numeric embedding of the visually-grounded embedding, processes the second numeric embedding of the second text segment using a second encoder neural network to generate a second encoded numeric embedding of the second numeric embedding, and combines the first and second encoded numeric embeddings in accordance with the weight value to generate the final numeric embedding of the first text segment. To combine the first and second encoded embeddings, the system performs a weighted sum of the first and second encoded embeddings, i.e., for each dimension of the first and second encoded embedding, the system determines a weighted sum of the value of the first encoded embedding in the dimension and the value of the second encoded embedding in the dimension in accordance with the weight value.

As with the gating neural network, the first and second encoder neural networks can also be trained to generate high-performing embeddings for the particular task, i.e., can also be trained jointly with the task-specific neural network.

As a particular example, each of the encoder neural networks can be a neural network that has one or more hidden layers, i.e., one or more fully-connected layers, followed by an inverse tangent output layer that generates the encoded numeric embedding. The first encoder neural network is only used for visually-grounded embeddings while the second encoder neural network is only used for second numeric embeddings.

This approach generates a final embedding independent of the context the words occur in, i.e., without considering the context in which the first text segment appears for the purposes of the request. In some cases, however, it may be beneficial to use contextual gates that are aware of the sentence that words appear in to decide how to weight the visually-grounded and second embeddings.

To implement contextual gating, the gating neural network is modified to account for the context of the first text segment. In particular, the gating neural network includes one or more recurrent neural network layers, e.g., bidirectional LSTM layers, followed by one or more feedforward neural network layers.

To take advantage of the context, the request specifies one or more context text segments for the first text segment, and the system processes the visually-grounded embeddings of the first text segment and the context text segments using the recurrent neural network layers to generate a contextualized visually-grounded embedding and processes the second numeric embeddings of the first text segment and the context text segments using the recurrent neural network layers to generate a contextualized second numeric embedding. The system then processes the contextualized visually-grounded embedding and the contextualized second numeric embedding using the feedforward neural network layers to generate the weight value as described above.

The system provides the final embedding of the first text segment in response to the request (step 308). For example, the system can provide the final embedding of the text segment as input to a task-specific neural network that operates on embeddings to perform the particular machine learning task.

In some cases, the system can use the visually-grounded embeddings to improve the accuracy of a neural network that maps a network input to a target sequence that includes a text segment in a target natural language at each of one or more output time steps. In particular, the system can use the visually-grounded embeddings in place of a conventional output layer of the neural network to select the text segment at each of the output time steps.

For example, the network input can be a sequence of text segments in a source natural language that is different than the target language and the target sequence can be a translation of the input sequence into the target natural language.

As another example, the network input can be an image and the target sequence can be caption for the image in the target natural language.

As another example, the network input can be a sequence of text segments in the target natural language and the target sequence can be a summary of the input sequence or an answer to a question posed by the input sequence.

Figure 4:
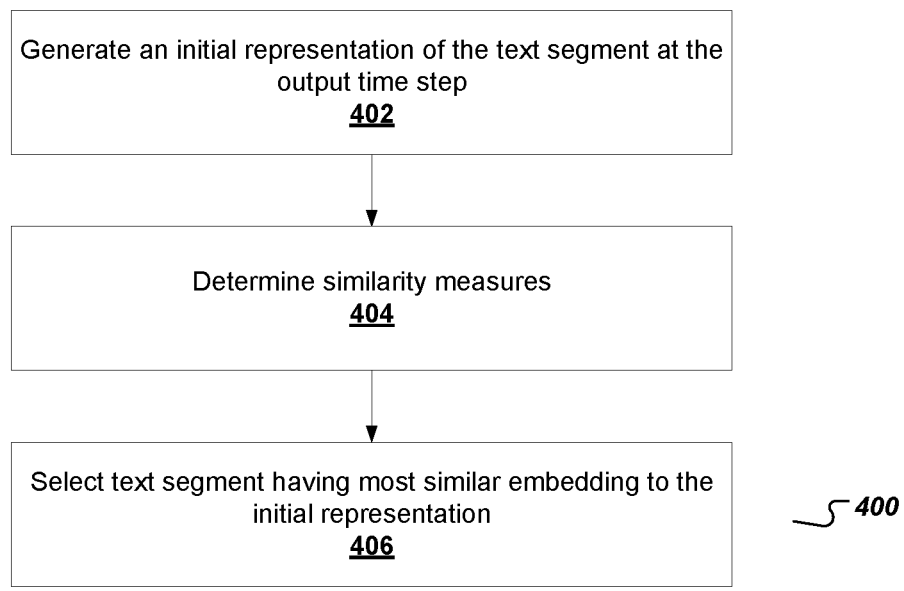
FIG. 4 is a flow chart of an example process for selecting a text segment for an output time step.

FIG. 4 is a flow diagram of an example process 400 for selecting a text segment for an output time step. For convenience, the process 400 will be described as being performed by a system of one or more computers located in one or more locations. For example, an embedding system, e.g., the text embedding system 100 of FIG. 1, appropriately programmed in accordance with this specification, can perform the process 400.

The system generates, from at least the network input, an initial representation of the text segment at the output time step using a task-specific neural network (step 402). In particular, the initial representation can be the input that would have been provided to the conventional output layer, e.g., the softmax output layer, of the task-specific neural network. For example, the task-specific neural network may be a sequence-to-sequence neural network that includes an encoder neural network and a decoder neural network. The initial representation can be the hidden state of the decoder neural network at the output time step, e.g., the hidden state that would have been used by a softmax output layer of the neural network to generate a probability distribution over text segments in the vocabulary. In this example, the system generates the initial representation by processing an embedding of the most-recently generated text segment, i.e., the text segment at the immediately preceding time step, using the decoder neural network. In some cases, the decoder neural network includes an attention mechanism that attends over the encoded representation of the network input generated by the encoder.

The system determines, for each text segment in the vocabulary of text segments in the target natural language, a similarity measure between the initial representation of the text segment at the output time step and a numeric embedding of the text segment (step 404). For example, the similarity measure can be the cosine similarity between the initial representation and the numeric embedding. As another example, the similarity measure can be the cosine similarity between (i) the initial representation and (ii) a sum of the numeric embedding and a learned weight vector for the text segment. As yet another example, the similarity measure can be a learned bias for the text segment plus the cosine similarity between (i) the initial representation and (ii) a sum of the numeric embedding and a learned weight vector for the text segment.

The system selects, as the text segment at the output time step, a text segment that has an embedding that is most similar according to the similarity measure to the initial representation (step 406). By selecting output text segments based on similarity to visually-grounded embeddings, the system can more accurately generate output sequence and, accordingly, increase performance on the machine learning task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating a data set that associates each text segment in a vocabulary of text segments with a respective numeric embedding, the method comprising, for each text segment in the vocabulary of text segments:
   providing, to an image search engine, a search query that includes the text segment;
   obtaining image search results that have been classified as being responsive to the search query by the image search engine, wherein each image search result identifies a respective image;
   for each image search result, processing the image identified by the image search result using a convolutional neural network, wherein the convolutional neural network has been trained to process the image to generate an image numeric embedding for the image; and
   generating a numeric embedding for the text segment from the image numeric embeddings for the images identified by the image search results.

2. The method of claim 1, wherein the image search results are ordered by the image search engine from most responsive to least responsive, and wherein generating the numeric embedding comprises:
   concatenating the image numeric embeddings according to the ordering of the corresponding image search results.

3. The method of claim 1, wherein the convolutional neural network has been trained on a semantic ranking objective to generate image numeric embeddings that preserve semantic similarities between input images.

4. The method of claim 1, wherein obtaining the image search results comprises:
   obtaining, from the image search engine, an initial set of image search results that are ordered by the image search engine from most responsive to least responsive; and
   selecting a subset of the initial set of image search results that are most responsive to the search query according to the order.

5. The method of claim 1, wherein the text segments in the vocabulary include words.

6. The method of claim 1, wherein the text segments in the vocabulary include one or more multi-word phrases.

7. A method comprising:
   maintaining data specifying, for each text segment in a vocabulary of text segments, a respective first numeric embedding and a respective different, second numeric embedding;
   receiving a request for a final numeric embedding of a first text segment in the vocabulary;
   processing the first numeric embedding and the second numeric embedding of the first text segment using a gating neural network, wherein the gating neural network is configured to process the first and second numeric embeddings to generate a weight value;
   processing the first numeric embedding of the first text segment using a first encoder neural network to generate a first encoded numeric embedding of the first numeric embedding;
   processing the second numeric embedding of the first text segment using a second encoder neural network to generate a second encoded numeric embedding of the second numeric embedding; and
   combining the first and second encoded numeric embeddings in accordance with the weight value to generate the final numeric embedding of the first text segment.

8. The method of claim 7, further comprising:
   generating the first numeric embeddings of the text segments in the vocabulary, the generating comprising, for each text segment in the vocabulary:
   providing, to an image search engine, a search query that includes the text segment;
   obtaining image search results that have been classified as being responsive to the search query by the image search engine, wherein each image search result identifies a respective image;
   for each image search result, processing the image identified by the image search result using a convolutional neural network, wherein the convolutional neural network has been trained to process the image to generate an image numeric embedding for the image; and
   generating a numeric embedding for the text segment from the image numeric embeddings for the images identified by the image search results.

9. The method of claim 7, wherein combining the first and second encoded numeric embeddings in accordance with the weight value to generate the final numeric embedding of the first text segment comprises:

for each dimension of the first and second encoded embedding, determining a weighted sum of the value of the first encoded embedding in the dimension and the value of the second encoded embedding in the dimension in accordance with the weight value.

10. The method of claim 7, wherein the gating neural network is a deep feedforward neural network.

11. The method of claim 7,
wherein the request specifies one or more context text segments for the first text segment,
wherein the gating neural network comprises one or more recurrent neural network layers followed by one or more feedforward neural network layers, and
wherein processing the first numeric embedding and the second numeric embedding of the first text segment using the gating neural network comprises:
processing the first numeric embeddings of the first text segment and the context text segments using the recurrent neural network layers to generate a contextualized first numeric embedding;
processing the second numeric embeddings of the first text segment and the context text segments using the recurrent neural network layers to generate a contextualized second numeric embedding; and
processing the contextualized first numeric embedding and the contextualized second numeric embedding using the feedforward neural network layers to generate the weight value.

12. The method of claim 11, wherein the recurrent neural network layers are bi-directional LSTM layers.

13. The method of claim 7, further comprising:
providing the final numeric embedding as input to a task-specific neural network.

14. A method of mapping a network input to a target sequence comprising a text segment in a target natural language at each of one or more output time steps, the method comprising, for each of the output time steps:
generating, from at least the network input, an initial representation of the text segment at the output time step using a task-specific neural network;
determining, for each text segment in a vocabulary of text segments in the target natural language, a similarity measure between the initial representation of the text segment at the output time step and a numeric embedding of the text segment; and
selecting, as the text segment at the output time step, a text segment that is most similar according to the similarity measure to the initial representation, wherein the numeric embeddings of the text segments in the vocabulary of text segments have been generated by, for each text segment in the vocabulary of text segments:
providing, to an image search engine, a search query that includes the text segment;
obtaining image search results that have been classified as being responsive to the search query by the image search engine, wherein each image search result identifies a respective image;
for each image search result, processing the image identified by the image search result using a convolutional neural network, wherein the convolutional neural network has been trained to process the image to generate an image numeric embedding for the image; and
generating a numeric embedding for the text segment from the image numeric embeddings for the images identified by the image search results.

15. The method of claim 14,
wherein the network input is a sequence comprising an input at each of a plurality of input time steps,
wherein the task-specific neural network is a sequence-to-sequence neural network comprising an encoder neural network and a decoder neural network, and
wherein the initial representation of the text segment at the output time step is a hidden state of the decoder neural network at the output time step.

16. The method of claim 15, wherein the sequence-to-sequence neural network comprises an attention mechanism.

17. The method of claim 14, wherein the network input is a sequence of text segments in a source natural language.

18. The method of claim 17, wherein the source language is different than the target language, and wherein the target sequence is a translation of the input sequence into the target natural language.

19. A system comprising one or more computers and one or more storage devices storing instructions that when executed by the one or more computers cause the one or more computers to perform operations for generating a data set that associates each text segment in a vocabulary of text segments with a respective numeric embedding, the operations comprising, for each text segment in the vocabulary of text segments:
providing, to an image search engine, a search query that includes the text segment;
obtaining image search results that have been classified as being responsive to the search query by the image search engine, wherein each image search result identifies a respective image;
for each image search result, processing the image identified by the image search result using a convolutional neural network, wherein the convolutional neural network has been trained to process the image to generate an image numeric embedding for the image; and
generating a numeric embedding for the text segment from the image numeric embeddings for the images identified by the image search results.

20. The system of claim 19, wherein the image search results are ordered by the image search engine from most responsive to least responsive, and wherein generating the numeric embedding comprises:
concatenating the image numeric embeddings according to the ordering of the corresponding image search results.

21. The system of claim 19, wherein the convolutional neural network has been trained on a semantic ranking objective to generate image numeric embeddings that preserve semantic similarities between input images.

22. A system comprising one or more computers and one or more storage devices storing instructions that when executed by the one or more computers cause the one or more computers to perform operations comprising:
maintaining data specifying, for each text segment in a vocabulary of text segments, a respective first numeric embedding and a respective different, second numeric embedding;
receiving a request for a final numeric embedding of a first text segment in the vocabulary;
processing the first numeric embedding and the second numeric embedding of the first text segment using a gating neural network, wherein the gating neural network is configured to process the first and second numeric embeddings to generate a weight value;

processing the first numeric embedding of the first text segment using a first encoder neural network to generate a first encoded numeric embedding of the first numeric embedding;

processing the second numeric embedding of the first text segment using a second encoder neural network to generate a second encoded numeric embedding of the second numeric embedding; and combining the first and second encoded numeric embeddings in accordance with the weight value to generate the final numeric embedding of the first text segment.

23. The system of claim 22, the operations further comprising:

generating the first numeric embeddings of the text segments in the vocabulary, the generating comprising, for each text segment in the vocabulary:

providing, to an image search engine, a search query that includes the text segment;

obtaining image search results that have been classified as being responsive to the search query by the image search engine, wherein each image search result identifies a respective image;

for each image search result, processing the image identified by the image search result using a convolutional neural network, wherein the convolutional neural network has been trained to process the image to generate an image numeric embedding for the image; and generating a numeric embedding for the text segment from the image numeric embeddings for the images identified by the image search results.

24. The system of claim 22, wherein combining the first and second encoded numeric embeddings in accordance with the weight value to generate the final numeric embedding of the first text segment comprises:

for each dimension of the first and second encoded embedding, determining a weighted sum of the value of the first encoded embedding in the dimension and the value of the second encoded embedding in the dimension in accordance with the weight value.

25. The system of claim 22, wherein the request specifies one or more context text segments for the first text segment, wherein the gating neural network comprises one or more recurrent neural network layers followed by one or more feedforward neural network layers, and wherein processing the first numeric embedding and the second numeric embedding of the first text segment using the gating neural network comprises:

processing the first numeric embeddings of the first text segment and the context text segments using the recurrent neural network layers to generate a contextualized first numeric embedding;

processing the second numeric embeddings of the first text segment and the context text segments using the recurrent neural network layers to generate a contextualized second numeric embedding; and processing the contextualized first numeric embedding and the contextualized second numeric embedding using the feedforward neural network layers to generate the weight value.

26. The system of claim 25, wherein the recurrent neural network layers are bi-directional LSTM layers.

27. The system of claim 22, the operations further comprising:

providing the final numeric embedding as input to a task-specific neural network.

28. A system comprising one or more computers and one or more storage devices storing instructions that when executed by the one or more computers cause the one or more computers to perform operations for mapping a network input to a target sequence comprising a text segment in a target natural language at each of one or more output time steps, the operations comprising, for each of the output time steps:

generating, from at least the network input, an initial representation of the text segment at the output time step using a task-specific neural network;

determining, for each text segment in a vocabulary of text segments in the target natural language, a similarity measure between the initial representation of the text segment at the output time step and a numeric embedding of the text segment; and selecting, as the text segment at the output time step, a text segment that is most similar according to the similarity measure to the initial representation, wherein the numeric embeddings of the text segments in the vocabulary of text segments have been generated by, for each text segment in the vocabulary of text segments:

providing, to an image search engine, a search query that includes the text segment;

obtaining image search results that have been classified as being responsive to the search query by the image search engine, wherein each image search result identifies a respective image;

for each image search result, processing the image identified by the image search result using a convolutional neural network, wherein the convolutional neural network has been trained to process the image to generate an image numeric embedding for the image; and generating a numeric embedding for the text segment from the image numeric embeddings for the images identified by the image search results.

29. One or more non-transitory computer-readable storage media storing instructions that when executed by one or more computers cause the one or more computers to perform operations for generating a data set that associates each text segment in a vocabulary of text segments with a respective numeric embedding, the operations comprising, for each text segment in the vocabulary of text segments:

providing, to an image search engine, a search query that includes the text segment;

obtaining image search results that have been classified as being responsive to the search query by the image search engine, wherein each image search result identifies a respective image;

for each image search result, processing the image identified by the image search result using a convolutional neural network, wherein the convolutional neural network has been trained to process the image to generate an image numeric embedding for the image; and generating a numeric embedding for the text segment from the image numeric embeddings for the images identified by the image search results.

30. One or more non-transitory computer-readable storage media storing instructions that when executed by the one or more computers cause the one or more computers to perform operations comprising:

maintaining data specifying, for each text segment in a vocabulary of text segments, a respective first numeric embedding and a respective different, second numeric embedding;

receiving a request for a final numeric embedding of a first text segment in the vocabulary;

processing the first numeric embedding and the second numeric embedding of the first text segment using a gating neural network, wherein the gating neural network is configured to process the first and second numeric embeddings to generate a weight value;

processing the first numeric embedding of the first text segment using a first encoder neural network to generate a first encoded numeric embedding of the first numeric embedding;

processing the second numeric embedding of the first text segment using a second encoder neural network to generate a second encoded numeric embedding of the second numeric embedding; and combining the first and second encoded numeric embeddings in accordance with the weight value to generate the final numeric embedding of the first text segment.

* * * * *